United States Patent [19]

Homer

[11] Patent Number: 5,556,218

[45] Date of Patent: Sep. 17, 1996

[54] TUBING CONNECTOR

[76] Inventor: John L. Homer, 6668 Salem Dr., Fishers, Ind. 46038

[21] Appl. No.: 421,918

[22] Filed: Apr. 14, 1995

[51] Int. Cl.$^6$ ........................................ F16B 7/00
[52] U.S. Cl. ..................... 403/170; 403/171; 403/174; 403/370
[58] Field of Search ............ 403/171, 169–170, 403/172–178, 217, 218, 219, 370, 367, 368, 365, 371, 6, 7; 52/648.1, 645, 646

[56] References Cited

U.S. PATENT DOCUMENTS

| 624,232 | 5/1899 | Marty, Jr. ........................ 403/370 X |
| 3,542,407 | 11/1970 | Brown ................................ 403/172 |
| 4,068,858 | 1/1978 | Harrison et al. .................. 403/370 X |
| 4,101,229 | 7/1978 | Weibull .............................. 403/171 |
| 4,575,132 | 3/1986 | Nattel ................................ 285/194 |
| 4,687,366 | 8/1987 | Wahlin ............................ 403/172 X |
| 5,058,347 | 10/1991 | Schuelke et al. .................... 52/339 |
| 5,068,494 | 11/1991 | Bolante .......................... 174/65.55 |
| 5,165,207 | 11/1992 | Dehlke ................................ 52/81 |
| 5,217,261 | 6/1993 | DeWitt et al. .................... 285/332.2 |
| 5,371,988 | 12/1994 | Hannes ........................... 403/174 X |

FOREIGN PATENT DOCUMENTS

| 1039734 | 10/1953 | France ................................ 403/171 |
| 2247926 | 8/1975 | France ................................ 403/171 |
| 202929 | 10/1983 | Germany ............................ 403/170 |
| 715735 | 12/1980 | U.S.S.R. ............................ 403/171 |

*Primary Examiner*—Kenneth J. Dorner
*Assistant Examiner*—Harry C. Kim
*Attorney, Agent, or Firm*—David L. Baker; Rhodes & Ascolillo

[57] ABSTRACT

The invention is a connector for square tubing used in a system of construction and includes many designs but all having a plurality of orthogonal arms connected at a common point and including a wedge block at the end distal from the common point. The arm and wedge block have complementary sloping surfaces that expand the wedge block as it is moved up the slope by a draw bolt which enters the side wall of the arm, crosses the primary longitudinal axis of the arm and exits proximate the opposed wall where it engages the wedge block. The expanded wedge block secures tubing in place over the arm to the arm. The hex head draw bolt is recessed in the arm of the connector.

5 Claims, 4 Drawing Sheets

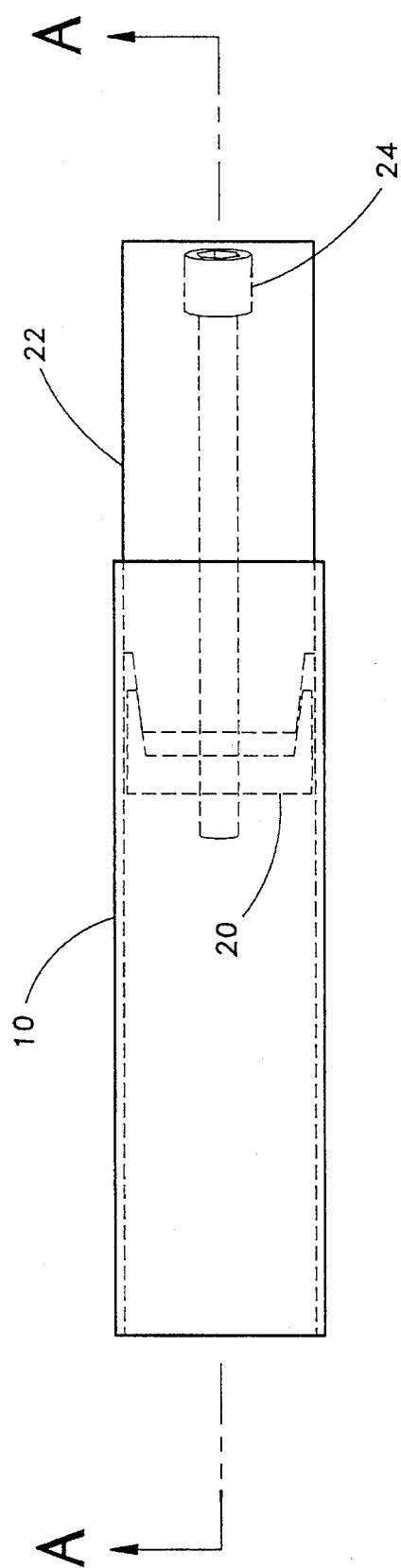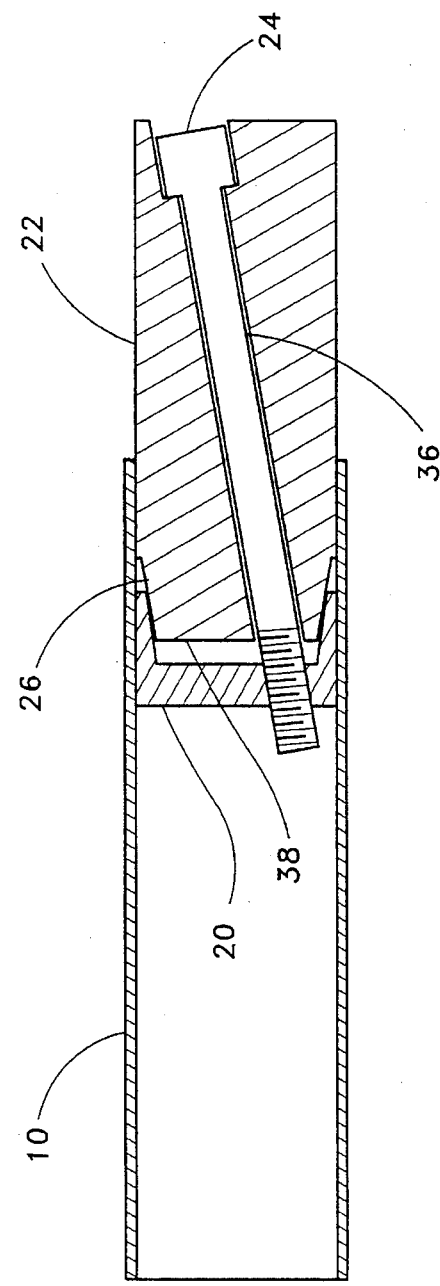
FIG. 4
FIG. 4A

TUBING CONNECTOR

BACKGROUND OF THE INVENTION

1. Field of the Invention

This invention relates generally to connectors for square tubing and in particular a connector that is interior wedge block affixed with a concealed draw rod or bolt.

2. Description of the Prior Art

The use of the wedge block technology to secure and affix tubular connectors has been available to those interested in the art field for some time. One of the drawbacks and deficiencies in this style connector thus far has been inability to provide a T connector because the shape precludes the use of multiple draw bolts. Other connectors with the same dilemma are the cross, side outlet elbow, side outlet tee and the floor flange. In some cases one draw bolt may be accessible however the shape precludes the use of the wedge block on other arms of the connector.

U.S. Patents that exemplify the state of the art include Nattel U.S. Pat. No. 4,575,132 issued Mar. 11, 1986, which shows a form of conduit wedge type connector. Also Schuelke et al. U.S. Pat. No. 5,058,347 issued Oct. 22, 1991 for a panel connector system that utilizes the wedge block construction system. Bolante U.S. Pat. No. 5,068,494 issued Nov. 26, 1991 for a connector for eccentrically dimensioned conduit, Oehlke U.S. Pat. No. 5,165,207 issued Nov. 24, 1992 for a space frame structure and DeWitt et al. U.S. Pat. No. 5,217,261 for a flairless compression fitting.

These references taken alone or in combination fail to anticipate the invention as disclosed and claimed herein.

SUMMARY OF THE INVENTION

The invention is characterized by connectors for tubing that use a wedge block securing system. The connectors may be formed from different materials dependent upon the material to be joined. For example, steel tubing would use connectors of forged steel or malleable iron; aluminum tubing, connectors of cast or forged aluminum and fiberglass, FRP and plastic connectors.

The connector has a sloped surface at distally located on each arm. The wedge block has a complementary surface the is drawn over the sloped surface by the draw bolt and is caused to expand and engage the interior surface of the tubing where it is held by a forced friction fit. The draw bolt passes through an elongated opening made for the purpose in the connector arm and is counter sunk at the head end. The draw bolt and elongated opening are at an angle to the primary longitudinal axis of the connector arm, whereby the head of the bolt enters on one side of the connector arm and exits at the end proximate the opposed wall of the connector arm. The draw bolt enters the wedge block at an angle and engages a threaded aperture angled appropriately for the purpose intended. The draw on the wedge block for tubing is short and as a result engaging the block at an angle will not be effected by the uneven distribution of force. The draw bolt is an internal hex head type and is manipulated with an Allen style wrench. When the connector is in place the head of the draw bolt is recessed in the connector arm and accessible only with tools designed for the purpose. The outer surface of the connector is smooth with no projections giving a better appearance and reducing the likelihood of injury or damage from extending bolt heads.

It is therefore an object of the invention to provide a new and improved tubing connector.

It is another object of the invention to provide a new and improved tubing connector that is simple and easy to use.

It is a further object of the invention to provide a new and improved tubing connector that will allow the use of wedge block securing technology on connectors not hither to adaptable to that technology.

It is still another object of the invention to provide a new and improved tubing connector which has all of the advantages of prior art connectors and none of the disadvantages.

It is still a further object of the invention to provide a new and improved tubing connector which is of a durable and reliable construction.

It is another object of the invention to provide a new and improved tubing connector which is low in cost of manufacture and therefore susceptible of low prices of sale to the consuming public.

These, together with other objects of the invention, along with the various features of novelty which characterized the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a top plan view of a connector arm inserted into a tubing section.

FIG. 4A is a cross sectional view taken along the line A—A in FIG. 4.

DETAILED DESCRIPTION OF A PREFERRED EMBODIMENT

Figure 1:
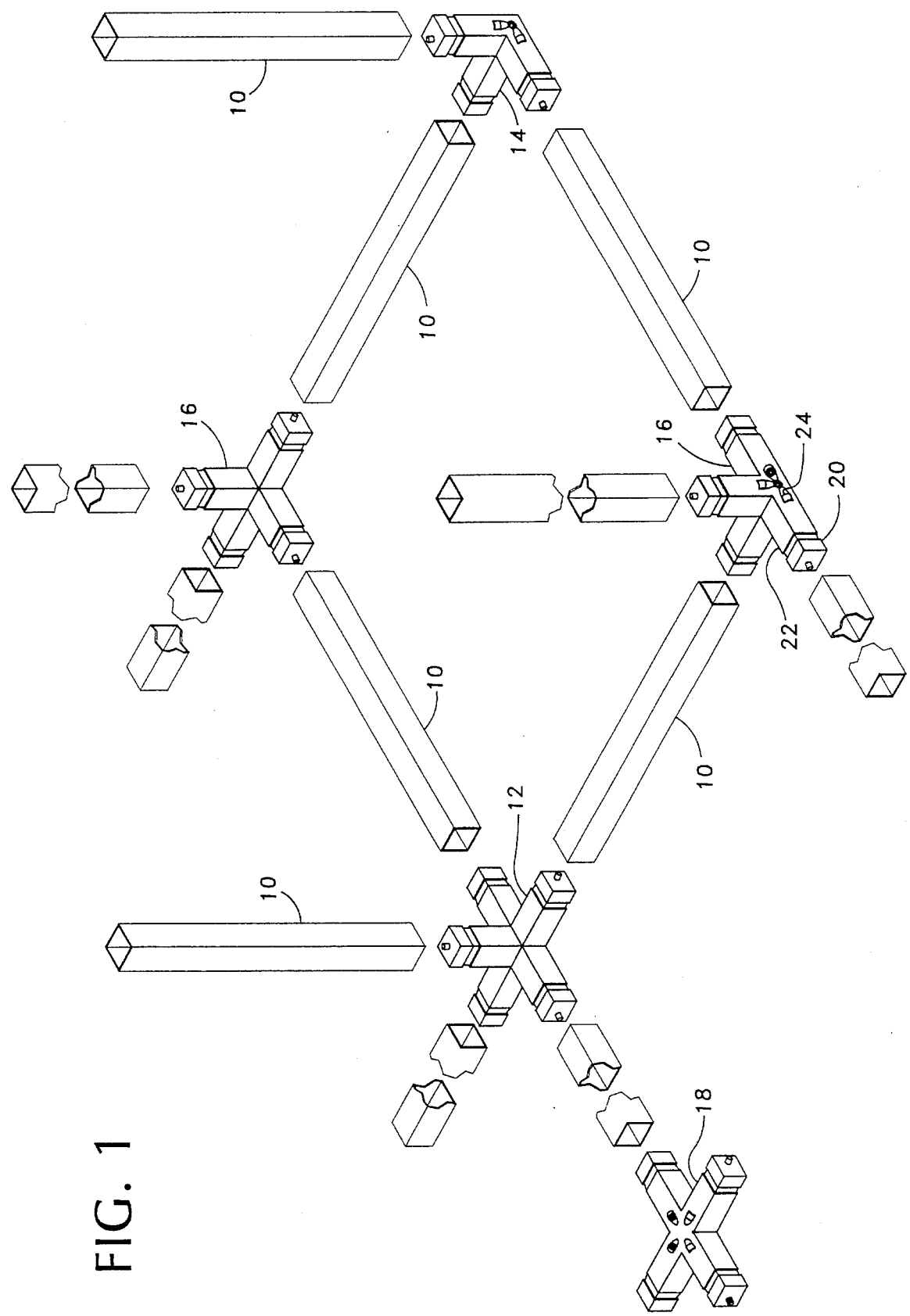
FIG. 1 is an exploded view of a typical connected tubular frame system showing samples of the types of connectors utilized.

Referring now to FIG. 1, a tubular system is shown consisting of sections of square tubing 10 formed from steel, aluminum or fiberglass materials. Typical connectors are shown including a floor flange 12, side outlet elbow 14, side outlet Tee 16 and a cross 18. Each connector includes a wedge block 20 at the end of the connector arm 22 and a recessed draw bolt 24.

Figure 2:
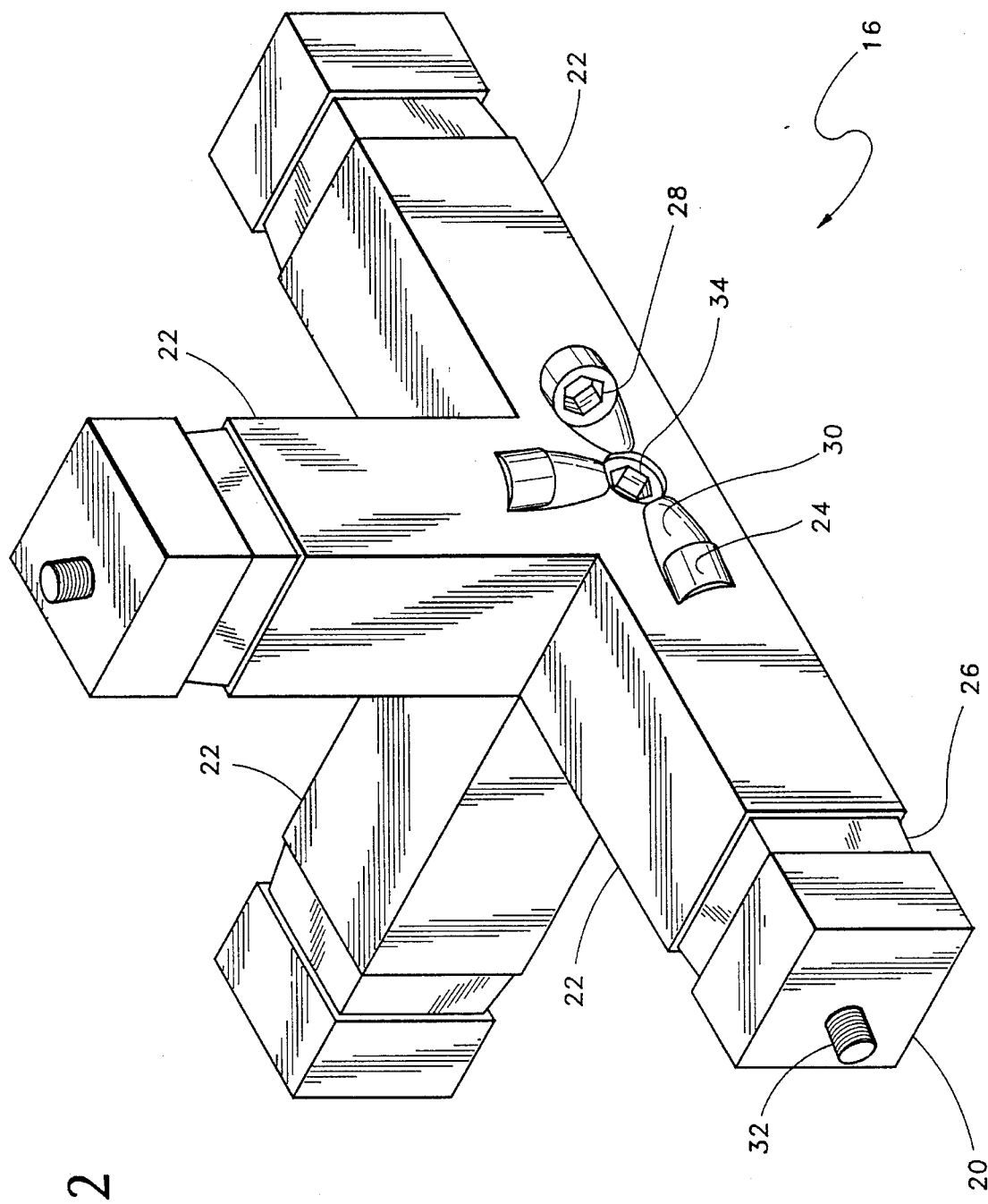
FIG. 2 is a perspective view of a connector contemplated by the invention.

FIG. 2 shows a side outlet Tee 16 with four arms 22 each terminating in a wedge surface 26 which is complementary to the wedge surface of the wedge block 20. The draw bolt 24 utilizes an internal hex head 28 for tool engagement which is contained in the recessed area 30 of the arm 22. The draw bolt passes through an opening formed in the arm and is made to engage the wedge block 20 at a point 32 off the center. The bolt is threaded as is the wedge block and turning the bolt draws the block over the surface 26 causing it to expand and engage the internal surface of tubing that is in place over the connector arm. In some instances it is possible to utilize the conventional on center connection between the bolt and wedge block as is shown with regard to bolt 34.

Figure 3A:
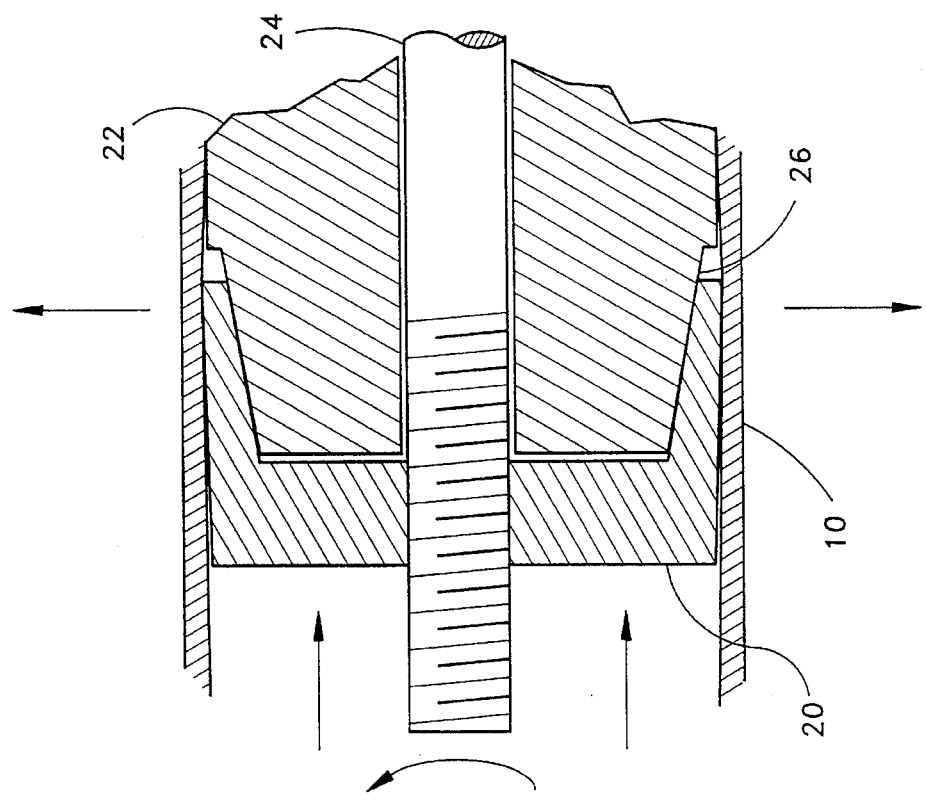
FIGS. 3A and 3B are cross sectional views of the wedge block securing system before and, after engagement.
Figure 3B:
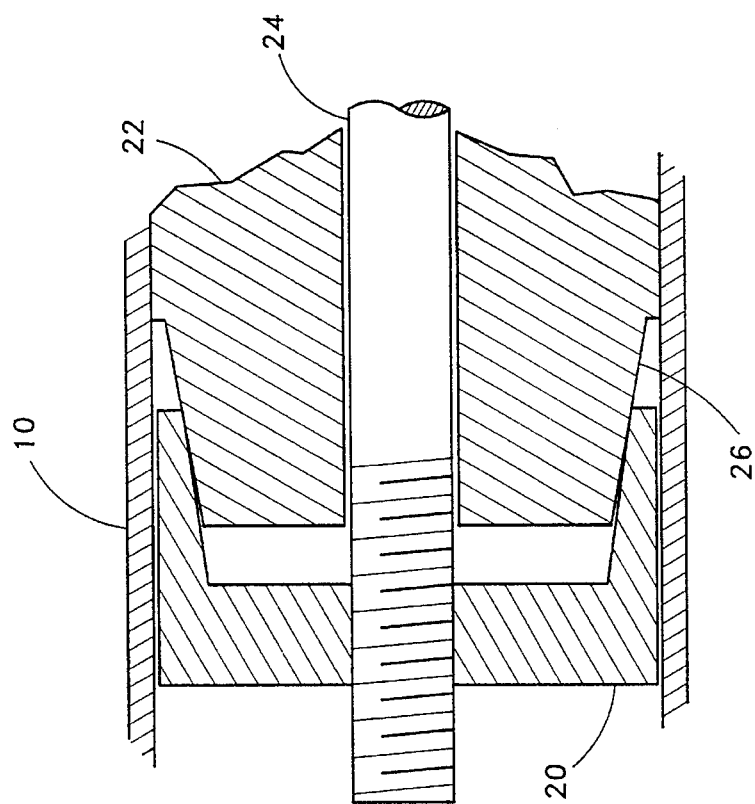

FIGS. 3A and 3B illustrate the operation of the wedge block system where connector arm 22 is inserted into a tube member 10. The wedge block 20 is relaxed and in loose engagement with the wedge surface 26. As the draw bolt 24 turns the block 20 moves up the surface 26 and expands against walls of the tube 10 causing a forced friction fit and thereby securing the connector arm in place. This example uses the a conventional on center approach to the wedge movement however the off center design of this disclosure accomplishes the objective.

Concerning FIGS. 4 and 4A, the connector arm 22 is inserted into a tube 10 and wedge block 20 is drawn up the wedge surface 26 and is expanded against the internal wall of the tube. The draw bolt 24 passes through an aperture 36 which is at an angle to the primary longitudinal axis of the arm 22. The head of bolt 24 is recessed in the arm and enters at one side while exiting at the end 38 proximate the opposed wall of the arm, the wedge block and is aperture and threaded to accept the draw bolt at the angle indicated.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A system of construction including square tubing having inner walls and a connector for connecting the tubing, wherein the improvement comprising:

said connector having a plurality of arms for receiving the square tubing;

wherein each of said plurality of arms having a longitudinal axis and being connected at a common area and extending orthogonally outward with respect to each other from the common area;

wherein each of the arms having four sidewalls extending parallel to the respective longitudinal axis, a free end wall disposed perpendicularly to the respective sidewalls, an exterior wedge surface disposed adjacent to the free end wall, and an aperture extending through along the length of the arm; and securing means associated with each of the arms and disposed distal from the common area for securing each of the arms to the respective tubing; and activating means associated with each of the arms and disposed proximate to the common area for activating the respective securing means;

wherein said securing means being a wedge block having a threaded hole and an interior wedge surface which complements and communicates with the exterior wedge surface of the respective arm;

wherein said activating means being a draw bolt which extends through the aperture of the respective arm and threadedly engages said threaded hole of the respective wedge block for drawing the wedge block toward the common area to force the wedge block against the inner walls of the respective tubing to secure the tubing to the arm;

wherein at least one of the arms being provided with said aperture which extends through one of the respective sidewalls to the free end wall whereby the respective draw bolt extends through said one of said sidewalls and the free end wall to threadedly engage the respective wedge block for drawing the wedge block to secure the respective tubing to the arm.

2. The system according to claim 1, wherein said at least one of the arms having a head of said respective draw bolt recessed in said one of said sidewalls of the arm.

3. The system according to claim 1, wherein at least one of the arms being provided with said aperture which extends parallel to the respective longitudinal axis and through the common area to the respective free end wall whereby the respective draw bolt extends through the common area and the free end wall to threadedly engage the respective wedge block for drawing the wedge block to secure the respective tubing to the arm.

4. The system according to claim 3, wherein said at least one of the arms with said aperture extending parallel to the longitudinal axis having a head of said respective draw bolt recessed in said common area.

5. The system according to claim 1, wherein said draw bolt having a recessed head for engagement with a tool.

* * * * *